UNITED STATES PATENT OFFICE.

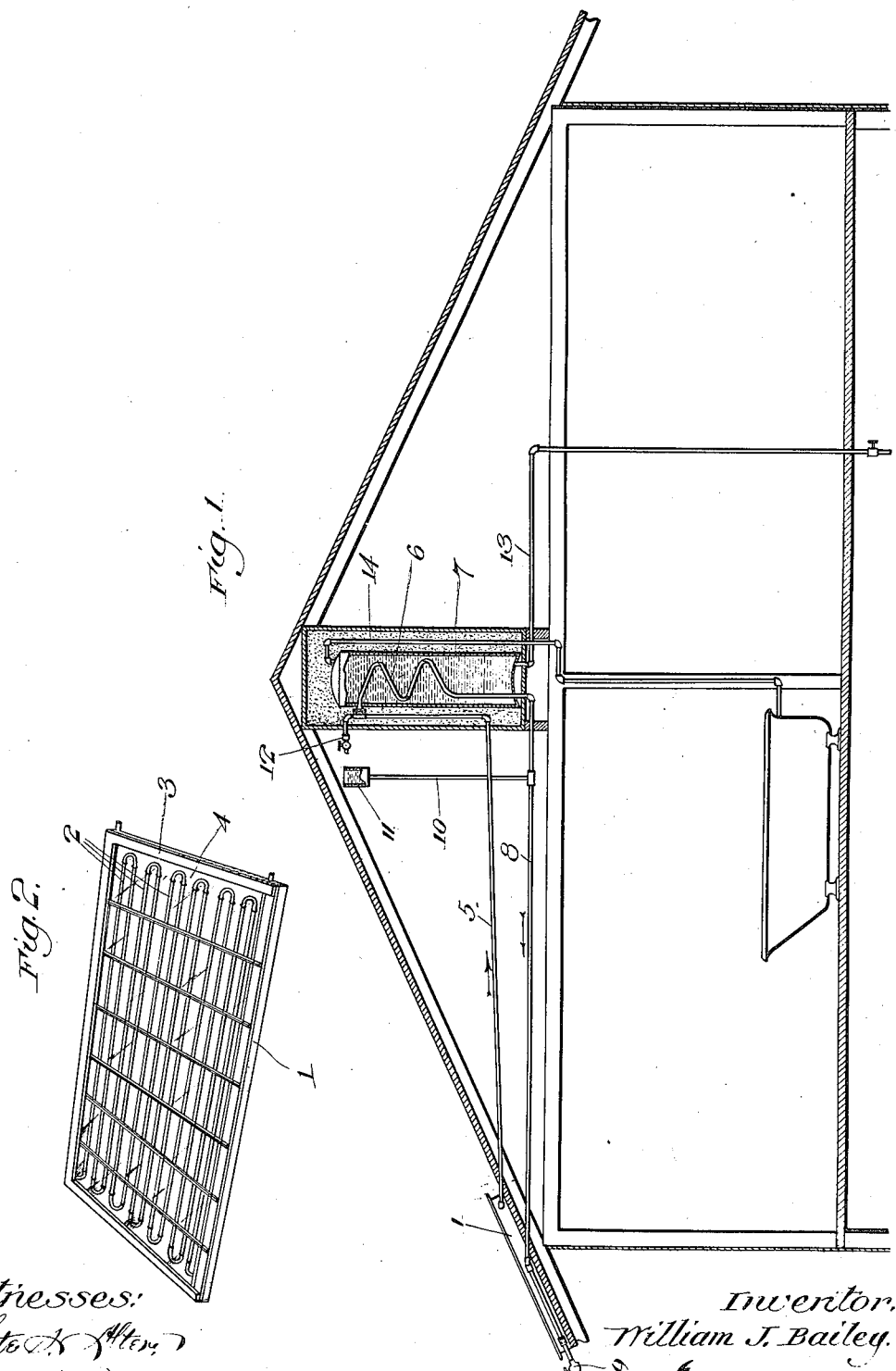

WILLIAM J. BAILEY, OF MONROVIA, CALIFORNIA.

SOLAR HEATER.

1,242,511.  Specification of Letters Patent.  Patented Oct. 9, 1917.

Application filed June 18, 1913. Serial No. 774,374.

*To all whom it may concern:*

Be it known that I, WILLIAM J. BAILEY, a citizen of the United States, residing at Monrovia, in the county of Los Angeles and State of California, have invented a new and useful Solar Heater, of which the following is a specification.

This invention relates to solar heaters and the main object of the invention is to provide for supplying water at the fixture to be used under full head, and enable the liquid which is circulated through the sun coil to be under a much lower pressure. Two important and valuable advantages are derived from this, one of which is that it enables me to construct the sun coil of lighter material as it does not have to withstand a heavy pressure, and the other is that it enables a relatively small amount of liquid to be utilized to circulate through the sun coil in a system independent of the water supply system, so that in case of freezing of the liquid in the sun coil which is in an exposed position, only that liquid which is in the sun coil circulating system will escape if the pipe or coil bursts, whereas in the systems as now constructed, should a coil or pipe burst, the flow of water will come directly from the supply and a large amount be wasted before it is shut off.

Another advantage is that with the independent sun coil circulating line, it is possible to drain such line if a freeze is anticipated, such drainage being quickly accomplished and with loss of but little liquid.

The second highly valuable feature is that it enables the employment of a non-freezing liquid in the sun heater circulating system if desired, so that danger from freezing is obviated. It is found in practice that the exposed portions of the system are the most apt to freeze, and by using a non-freezing solution to circulate through the sun heater and through the body of water to be heated, without coming in direct communication with said body of water, I secure substantially as great a heating capacity as though the water which is to be heated were itself caused to circulate through the heater.

Another advantage is that by using a circulating system which is independent of the water supply system, I am enabled to employ a liquid which is of a nature which will not cause any deposits on the pipes. In many localities it is practically impossible to employ a solar heater on account of the rapidity with which deposits accumulate in the heater from the water.

Referring to the drawings:

Figure 1 is a vertical section through a house, showing the system installed.

Fig. 2 is a perspective view of the sun heater in detail.

1 designates the sun heater which is located in any convenient position to receive the heat from the sun, as for example, on the roof, as shown. The essential feature in the construction of the sun heater is that it be capable of transferring heat from the sun to the water or other liquid within the sun heater. This may be accomplished in various ways. One method consists of a series of coils of pipe 2, which are inclosed in a box 3 with a transparent top 4. These coils form part of what may be termed the sun heater circulating system, the other portion of which consists of a pipe 5 leading from the upper discharge end of the sun heater to a transferring coil 6, the latter being located within a tank 7 and a pipe 8 leading from the other end of the transferring coil 6 to the inlet end of the sun heater 1. 9 is a drain cock at the lower end of the sun heater circulating system and enables the water or other liquid therein to be quickly drained when desired. 10 is a stand pipe extending up from the pipe 8 and having a small reservoir 11 at its upper end which is in communication with the atmosphere, so that the only pressure in the sun heater circulating system is that due to the slight head furnished by the stand pipe 10. A cock 12 is employed at the upper end of the transfer coil 6 to facilitate draining or filling the sun heater circulating system.

The liquid used in the sun heater circulating system is preferably a non-freezing solution such, for example, as a mixture of water with a sufficient proportion of alcohol to prevent freezing. But ordinary water could be employed in place of the non-freezing solution, which, however, should be drained off in advance of a freeze.

The water which is to be heated is introduced into the tank 7 through an inlet pipe 13, and the heated water in the tank 7 is discharged through a pipe 14 which leads to the place of use. The pressure in pipes 13 and 14 and tank 7 is the regular city pressure and this water is heated by the conduction of heat by the walls of the coil 6 from the liquid inside the coil 6 to the water within the tank 7, the liquid within the coil 6 having been heated in the sun coil 1. The heated liquid from the sun coil 1 passes through pipe 5 into the upper part of coil 6, its heat extracted from it and delivered to the water in the tank 7, and the cooled liquid within the coil 6 circulates downward through the coil and returns through pipe 8 to the sun heater to be again heated.

What I claim is:

1. Means for exposing a non-freezing liquid to heat from the sun to heat the said liquid, water containing means, and means for transferring heat from the liquid to the water.

2. Means for exposing non-freezing liquid to heat from the sun to heat said liquid, water containing means, and means for conducting said liquid into close proximity with the water containing means to cause heat to be transferred from said liquid to the water.

3. Means located in an exposed position for containing non-freezing liquid to cause the liquid to be heated by the sun, means for containing water in a protected position, and means for circulating liquid from the first means in proximity to the water in the protected position to transfer heat from said liquid to the water.

4. In a solar heater, a sun heater circulating system, a non-freezing liquid in said system, a sun heater connected in said system, a tank containing water to be heated, a portion of said sun heater circulating system extending into said tank, and means for conducting water to and from said tank.

5. In a solar heater, a sun heater circulating system, a sun heater connected in said system, a non-freezing liquid in said system, a standpipe in said system, a water tank into which a portion of said system extends, and means for conducting water to and from said tank.

6. In a solar heater, a city pressure water supply system for supplying pure water for use, a tank connected in said system to hold said pure water, a sun heater circulating system independent of the city pressure system, and extending into said tank, and a sun heater connected in said sun heater circulating system.

7. In a solar heater, a water line under pressure, a pressure tank connected in said water line, a sun heater circulating system, part of which extends through said tank, and a non-freezing liquid in said sun heater circulating system.

8. In a solar heater, a water line under pressure, a pressure tank connected in said water line, a sun heater circulating system, part of which extends through said tank, a non-freezing liquid in said sun heater circulating system, and a standpipe open to atmosphere connected in said sun heater circulating system to maintain atmospheric pressure in said circulating system.

In testimony whereof, I have hereunto set my hand at Los Angeles, California, this 11th day of June, 1913.

WILLIAM J. BAILEY.

In presence of—
 GEO. T. HACKLEY,
 MARTHA M. LANGE.